US012624583B2

(12) United States Patent
Lee

(10) Patent No.: US 12,624,583 B2
(45) Date of Patent: May 12, 2026

(54) SLIDING DOOR DEVICE FOR VEHICLE

(71) Applicants:Hyundai Motor Company, Seoul
(KR); Kia Corporation, Seoul (KR)

(72) Inventor: Jaeseung Lee, Whasung-Si (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 406 days.

(21) Appl. No.: 18/197,943

(22) Filed: May 16, 2023

(65) Prior Publication Data

US 2024/0109402 A1     Apr. 4, 2024

(30) Foreign Application Priority Data

Sep. 30, 2022    (KR) ........................ 10-2022-0125718

(51) Int. Cl.
*E05D 15/10*        (2006.01)
*B60J 5/06*        (2006.01)
(52) U.S. Cl.
CPC .............. *E05D 15/101* (2013.01); *B60J 5/06*
(2013.01); *E05D 15/1007* (2013.01); *E05D*
*15/1047* (2013.01); *E05D 2015/1026*
(2013.01); *E05Y 2900/531* (2013.01)

(58) Field of Classification Search
CPC .............. E05D 15/101; E05D 15/1007; E05D
15/1047; E05D 2015/1026
See application file for complete search history.

(56) References Cited

U.S. PATENT DOCUMENTS 9,321,333 B2 *    4/2016  Fukumoto .................. B60J 5/06
11,555,343 B2 *    1/2023  Yun ............................ B60J 5/06
11,603,692 B2 *    3/2023  Yun ..................... E05D 15/0621

* cited by examiner

*Primary Examiner* — Marcus Menezes
(74) *Attorney, Agent, or Firm* — MORGAN, LEWIS &
BOCKIUS LLP

(57)        ABSTRACT
A sliding door device includes: a door configured to open or
close a door opening portion formed in a vehicle body; a
lower arm including one end portion connected to an inter-
nal side of the door, and the other end portion configured to
slide along a rail provided on the vehicle body; a lower arm
carrier rotatably connected to the other end portion of the
lower arm and configured to slide the lower arm while
moving along a rail provided on the vehicle body; a lower
arm rotor rotatably provided on the lower arm carrier and
including one end portion connected to the lower arm so that
the lower arm rotates; a catch configured to fix the door by
engaging with the lower arm rotor after the door slides; and
a pawl with which the catch engages by rotating so that a
rotation of the catch is prevented.

18 Claims, 11 Drawing Sheets

100

100

<u>100</u>

SLIDING DOOR DEVICE FOR VEHICLE

CROSS-REFERENCE TO RELATED APPLICATION

The present application claims priority to Korean Patent Application No. 10-2022-0125718 filed on Sep. 30, 2022, the entire contents of which is incorporated herein for all purposes by this reference.

BACKGROUND OF THE PRESENT DISCLOSURE

Field of the Present Disclosure

Various embodiments of the present disclosure relates to a sliding door device for a vehicle, and more particularly, to a sliding door device for a vehicle, which is configured to open or close a door opening portion of a vehicle body while sliding forward or rearward in a longitudinal direction of a vehicle.

Description of Related Art

In general, a vehicle has an occupant compartment having a predetermined size in which a driver or an accompanied occupant may be accommodated, and occupant compartment opening/closing doors are provided on a vehicle body to open or close the occupant compartment.

In the case of a passenger vehicle, the occupant compartment opening/closing doors include a front door provided at a front side in a longitudinal direction of the vehicle and a rear door provided at a rear side in the longitudinal direction of the vehicle. The front door and the rear door are typically provided on the vehicle body to be rotatable by hinges.

Meanwhile, in the case of a van in which many persons may be accommodated, the occupant compartment opening/closing doors slide forward and rearward in the longitudinal direction of the vehicle to open or close the occupant compartment.

In the case of the slide type occupant compartment opening/closing door for a van, the occupant compartment opening/closing door is configured to move rearward in the longitudinal direction of the vehicle to open the occupant compartment, and move forward in the longitudinal direction of the vehicle to close the occupant compartment. Therefore, the slide type occupant compartment opening/closing door includes an advantage in that a space required to open or close the door is smaller in the slide type occupant compartment opening/closing door than in the hinged occupant compartment opening/closing door applied to the passenger vehicle and a door opening formed in the vehicle body may be completely opened even though the space required to open or close the door is small.

However, in the case of the slide type occupant compartment opening/closing door generally, a space in which a door arm (lower arm) enters a side sill portion of the vehicle at the time of opening or closing the door is excessively large because of a fixed sliding door arm structure. For the present reason, there is a problem in that a height of a floor of the vehicle needs to be increased to ensure the space. Furthermore, because of vehicle design, a vehicle body space and a door opening width may be insufficient to configure a center portion rail. Furthermore, because a center roller driving space is exposed from an external appearance of a vehicle body, the marketability and aesthetic appearance of the vehicle may deteriorate.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sliding door device for a vehicle, in which a dual rail enables rectilinear and rotation motions of a lower arm, which makes it possible to ensure a door opening width and solve a problem in that there is an excessively large space in which a lower arm enters a side sill portion of a vehicle.

Various aspects of the present disclosure are directed to providing a sliding door device for a vehicle, the sliding door device including: a door configured to open or close a door opening portion formed in a vehicle body; a lower arm including a first end portion connected to an internal side of the door, and a second end portion configured to slide along a rail provided on the vehicle body; a lower arm carrier rotatably connected to the second end portion of the lower arm and configured to slide the lower arm while moving along a rail provided on the vehicle body; a lower arm rotor rotatably provided on the lower arm carrier and including an end portion connected to the lower arm so that the lower arm rotates; a catch configured to fix the door by engaging with the lower arm rotor after the door slides; and a pawl with which the catch engages by rotating so that a rotation of the catch is fixed.

The second end portion of the lower arm may slide along a first lower rail and an upper rail provided at a lower side of the vehicle body.

The catch may be rotatably provided at an upper end portion of a rail box that surrounds the second lower rail.

An upper roller may be rotatably provided on an upper surface of the second end portion of the lower arm, and the upper roller may be inserted into the upper rail and roll in a longitudinal direction of the upper rail.

Pairs of legs having different lengths may be respectively provided at a first end portion of the lower arm rotor and a first end portion of the catch.

When the door is opened, the catch pin may be inserted between and come into contact with the pair of legs provided at a first end portion of the lower arm rotor, the lower arm rotation pin may be inserted between and come into contact with the pair of legs provided at a first end portion of the catch, and when the lower arm moves, the lower arm rotor and the catch may rotate together about the catch pin in a state in which the lower arm rotor and the catch are fixed.

When the door is opened, the lower arm rotor and the catch may further rotate toward a rear side of the vehicle in a state in which the lower arm rotor and the catch are fixed, and the second end portion of the catch may be fixed by engaging with an end portion of the pawl.

When the door is closed, a cable connected to an end portion of the pawl may be pulled toward the vehicle body, the pawl may be rotated, and the second end portion of the catch and an end portion of the pawl may be disengaged.

When the door is closed, the lower arm rotor and the catch may further rotate toward a front side of the vehicle in a state in which the lower arm rotor and the catch are fixed so that the lower arm rotor and the catch may be disengaged, and the catch may return to an original position thereof.

A lower roller may be rotatably provided on a lower surface of the second end portion of the lower arm, and the lower roller may be inserted into the first lower rail and roll in a longitudinal direction of the first lower rail.

The lower arm carrier may include a plurality of lower arm carrier rollers, and the plurality of lower arm carrier rollers may roll along an internal surface of the second lower rail.

The upper rail and the first lower rail may each have a curved shape so that the door moves inward or outward relative to the vehicle when the lower arm moves.

The catch may be provided to be rotatable about a catch pin provided on the rail box.

The lower arm rotor may be disposed in a direction parallel to a longitudinal direction of the lower arm.

The lower arm rotor may be rotatably provided on the lower arm carrier by a lower arm rotation pin provided on the lower arm carrier.

According to the exemplary embodiment of the present disclosure, the lower arm, which moves along the dual rail, is applied to enable the door to slide and rotate so that a door opening width may be ensured.

Furthermore, the extent to which the lower arm enters the interior of the vehicle body is eliminated so that the vehicle body including a flat structure may be implemented, and a height (step height) of the vehicle body may be reduced.

Furthermore, the rectilinear motion of the door is implemented, which makes it possible to improve a degree of freedom of a layout and a degree of design freedom of the interior.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
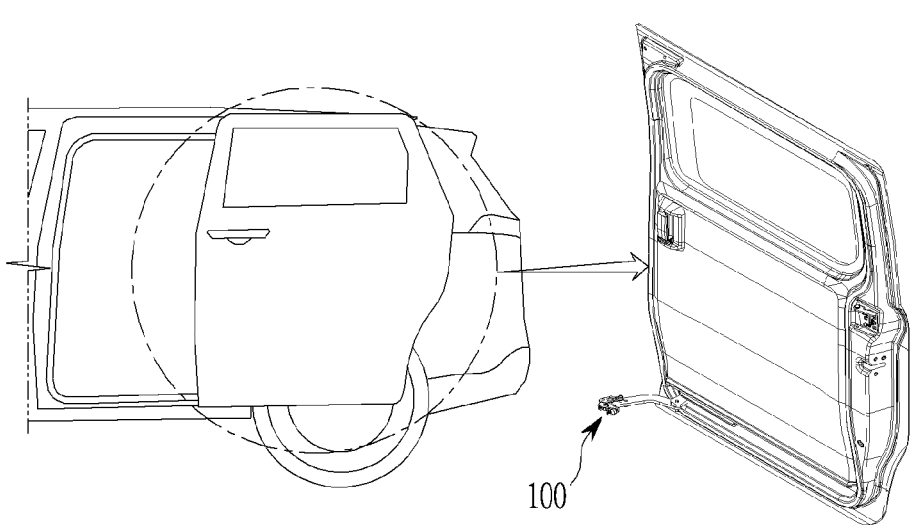
FIG. 1 is a view exemplarily illustrating a state in which a sliding door device for a vehicle according to various exemplary embodiments of the present disclosure is applied to a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings so that those with ordinary skill in the art to which an exemplary embodiment of the present disclosure pertains may easily carry out the embodiments. The present disclosure may be implemented in various different ways and is not limited to the exemplary embodiments described herein.

Furthermore, the constituent elements having the same configurations in several embodiments will be assigned with the same reference numerals and described only in the representative embodiment, and only the constituent elements, which are different from the constituent elements according to the representative embodiment, will be described in other exemplary embodiments of the present disclosure.

It is noted that the drawings are schematic and are not illustrated based on actual scales. Relative dimensions and proportions of parts illustrated in the drawings are exaggerated or reduced in size for clarity and convenience in the drawings, and any dimension is just illustrative but not restrictive. The same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

The exemplary embodiment of the present disclosure specifically illustrates an example of the present disclosure. As a result, various modifications of the drawings are expected. Therefore, the embodiments are not limited to specific forms in regions illustrated in the drawings, and for example, include modifications of forms by the manufacture thereof.

Hereinafter, a structure of a sliding door device for a vehicle according to various exemplary embodiments of the present disclosure will be described in detail with reference to the accompanying drawings.

Figure 2:
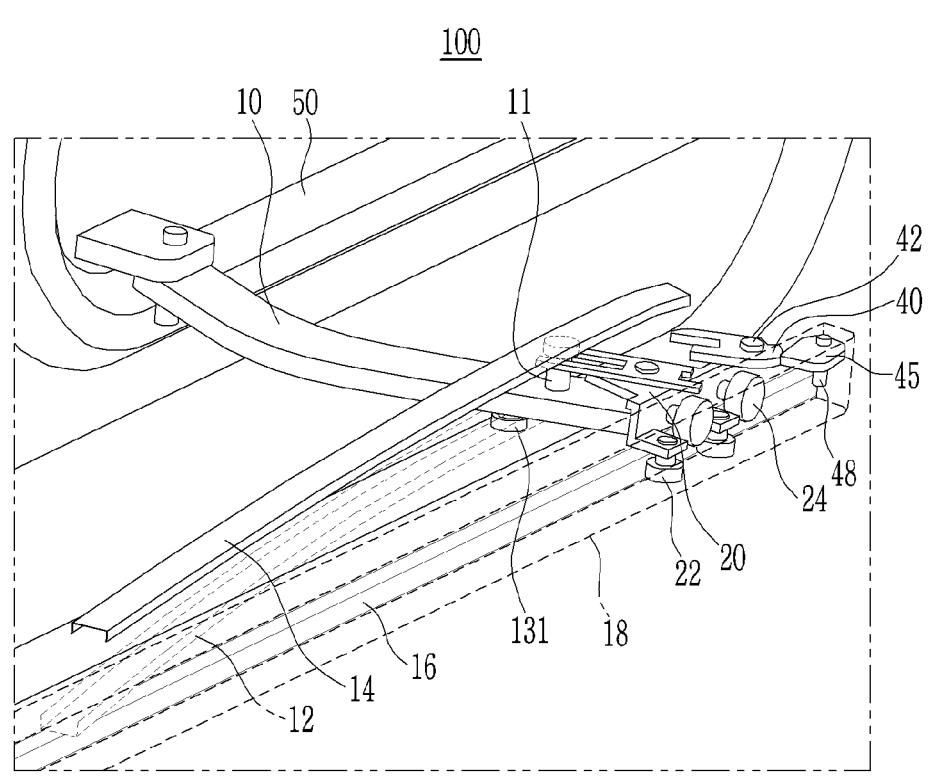
FIG. 2 is a view exemplarily illustrating the sliding door device for a vehicle according to the exemplary embodiment of the present disclosure.

FIG. 1 is a view exemplarily illustrating a state in which a sliding door device for a vehicle according to various exemplary embodiments of the present disclosure is applied to a vehicle, and FIG. 2 is a view exemplarily illustrating the sliding door device for a vehicle according to the exemplary embodiment of the present disclosure.

As illustrated in FIG. 1, a sliding door device 100 for a vehicle according to various exemplary embodiments of the present disclosure is provided at a lower side of an interior of a rear door 50 of a vehicle and used to open or close the door 50 by sliding the door 50 forward or rearward thereof.

Referring to FIG. 2, the sliding door device 100 for a vehicle according to the exemplary embodiment of the present disclosure includes: the door 50 configured to open or close a door 50 opening portion formed in a vehicle body; a lower arm 10 including one end portion connected to an internal side of the door 50; a lower arm carrier 20 rotatably connected to the other end portion of the lower arm 10; a lower arm rotor 30 rotatably provided on the lower arm carrier 20; a catch 40 rotatably provided at an upper end portion of a rail box 18; and a pawl 45 configured to engage with the catch 40 and fix a rotation of the catch 40.

One end portion of the lower arm 10 is rotatably connected to the internal side of the door 50, and the other end portion of the lower arm 10 is configured to slide along rails 12 and 14 provided at a lower side of the vehicle body. The rails 12 and 14 are configured as a vertical upper rail 14 and a first lower rail 12 extending in a longitudinal direction of the vehicle body with the lower arm 10 interposed therebetween.

The upper rail 14 and the first lower rail 12 may each have a shape convexly curved toward the door 50 so that the door 50 may move inward or outward relative to the vehicle when the other end portion of the lower arm 10 slides. Therefore, when the lower arm 10 moves, the door 50 naturally moves inward or outward relative to the vehicle.

The lower arm carrier 20 is rotatably connected to the other end portion of the lower arm 10. The lower arm carrier 20 may slide the lower arm 10 while moving along a second lower rail 16 provided at the lower side of the vehicle body. The lower arm carrier 20 may be rotatably coupled to an upper surface of the lower arm 10 by a lower arm rotation pin 32 and rectilinearly move along the second lower rail 16.

The lower arm rotor 30 may be rotatably coupled to an upper surface of the lower arm carrier 20 by the lower arm rotation pin 32 and disposed in a direction parallel to a longitudinal direction of the lower arm 10. When the lower arm carrier 20 rectilinearly moves along the second lower rail 16, the other end portion of the lower arm 10 and the lower arm rotor 30 may rotate relative to the lower arm carrier 20.

The second lower rail 16 is disposed to be surrounded by the rail box 18. The rail box 18 extends in the longitudinal direction of the vehicle body. The catch 40 may be rotatably provided on an external surface of an upper end portion of the rail box 18 by a catch pin 42. When the lower arm carrier 20 and the lower arm rotor 30 move as the door 50 slides, the catch 40 may engage with the lower arm rotor 30 so that the door 50 may be fixed.

When the catch 40 engages with the lower arm rotor 30 and the lower arm 10 further moves, the catch 40 rotates. When the catch 40 engages with the pawl 45, the rotation of the catch 40 may be fixed.

Figure 3:
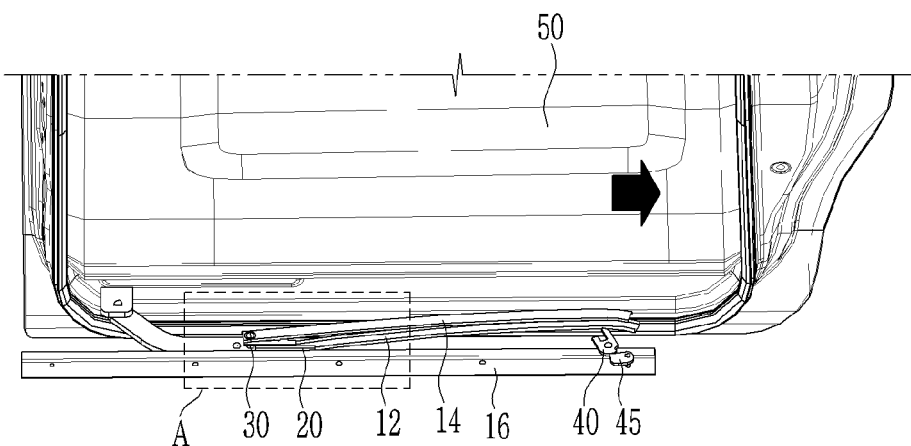
FIG. 3 is a view exemplarily illustrating a door closed state of the sliding door device for a vehicle according to the exemplary embodiment of the present disclosure.
Figure 4:
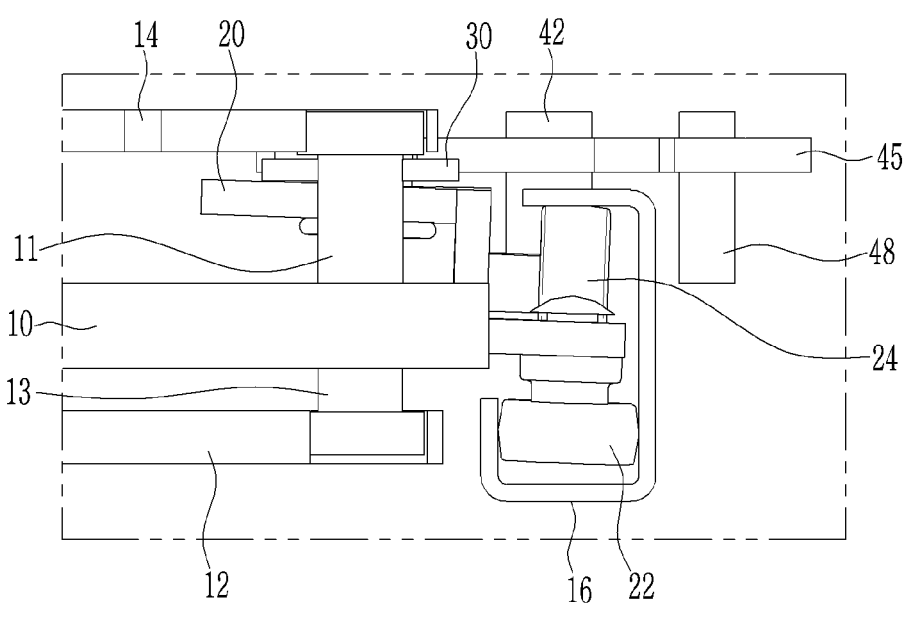
FIG. 4 is an enlarged cross-sectional view of part 'A' in FIG. 3.
Figure 5:
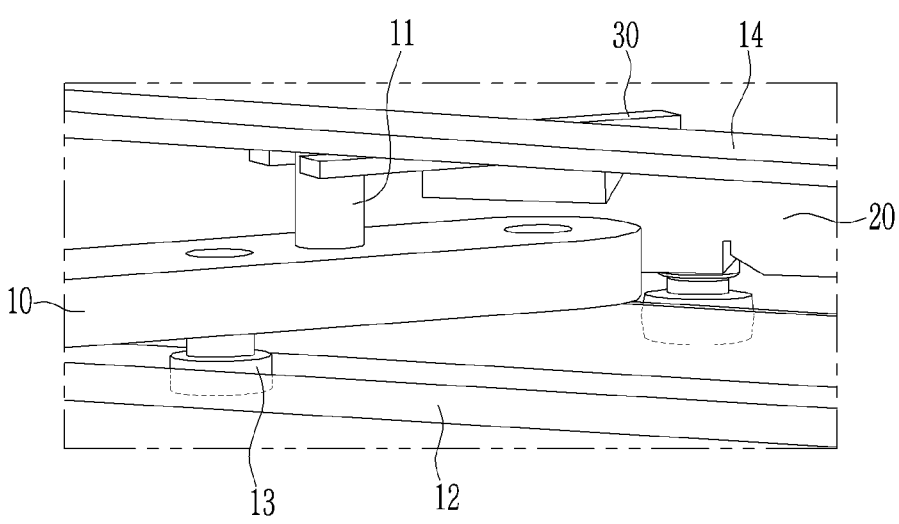
FIG. 5 is an enlarged perspective view of part 'A' in FIG. 3.

FIG. 3 is a view exemplarily illustrating a door closed state of the sliding door device for a vehicle according to the exemplary embodiment of the present disclosure, FIG. 4 is an enlarged cross-sectional view of part 'A' in FIG. 3, and FIG. 5 is an enlarged perspective view of part 'A' in FIG. 3.

As illustrated in FIG. 3, in the door 50 closed state, the other end portion of the lower arm 10, the lower arm carrier 20, and the lower arm rotor 30 are positioned at positions farthest from the catch 40 and the pawl 45, and the lower arm 10 is disposed approximately in parallel with an internal surface of the door 50.

Referring to FIG. 4 and FIG. 5, an upper roller 11 is rotatably provided on an upper surface of the other end portion of the lower arm 10. The upper roller 11 may be inserted into the upper rail 14 and roll in a longitudinal direction of the upper rail 14.

A lower roller 13 is rotatably provided on a lower surface of the other end portion of the lower arm 10. The lower roller 13 may be inserted into the first lower rail 12 and roll in a longitudinal direction of the first lower rail 12.

The upper rail 14 and the first lower rail 12 may be disposed at positions above and below the other end portion of the lower arm 10 and have the same shape. The upper rail 14 and the first lower rail 12 may extend in the longitudinal direction of the vehicle body. The upper rail 14 and the first lower rail 12 may each have a curved shape so that the door 50 moves inward or outward relative to the vehicle when the lower arm 10 moves. That is, the upper rail 14 and the first lower rail 12 may each have a shape convex outward with respect to the vehicle so that the door 50 may be naturally opened to the outside of the vehicle as the upper roller 11 and the lower roller 13 at the other end portion of the lower arm 10 move along the upper rail 14 and the first lower rail 12 when the door 50 is opened.

Meanwhile, the lower arm carrier 20 may include a plurality of lower arm carrier rollers 22 and 24. The upper roller 11 may be provided at one end portion of the lower arm carrier 20, and the lower arm carrier rollers 22 and 24 may be provided at the other end portion of the lower arm carrier 20. The lower arm carrier rollers 22 and 24 may roll along an internal surface of the second lower rail 16. Therefore, when the lower arm 10 moves, the lower arm carrier 20 may rectilinearly move along the second lower rail 16.

Meanwhile, the catch 40 may be provided to be rotatable about the catch pin 42 provided on the rail box 18. The pawl 45 may be provided to be rotatable about a pawl shaft 48 provided on the rail box 18.

Figure 6:
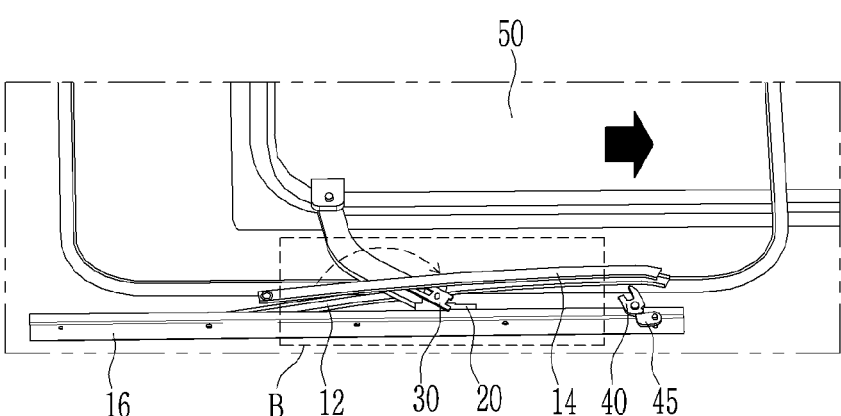
FIG. 6 is a view exemplarily illustrating an opening start state of the sliding door device for a vehicle according to the exemplary embodiment of the present disclosure.
Figure 7:
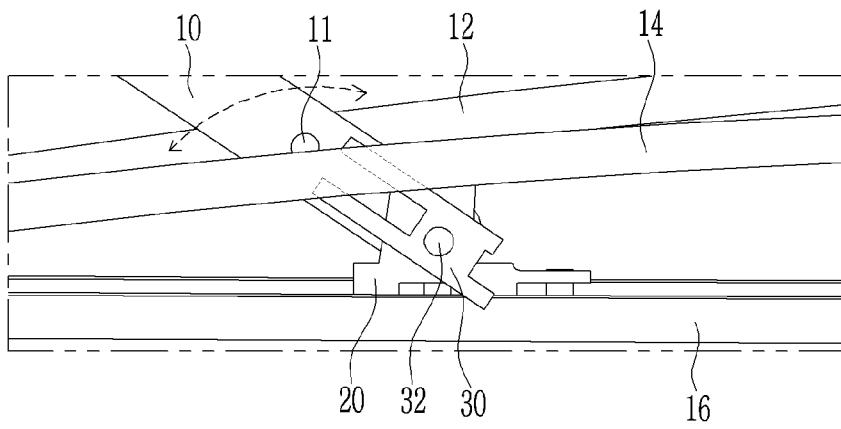
FIG. 7 is an enlarged view of part 'B' in FIG. 6.

FIG. 6 is a view exemplarily illustrating an opening start state of the sliding door device for a vehicle according to the exemplary embodiment of the present disclosure, and FIG. 7 is an enlarged view of part 'B' in FIG. 6.

Referring to FIG. 6 and FIG. 7, when the door 50 begins to be opened, the other end portion of the lower arm 10 and the lower arm carrier 20 move toward the rear side of a vehicle body. The upper roller 11 and the lower roller 13 respectively roll along the upper rail 14 and the first lower rail 12. The lower arm rotor 30 rotates together with the lower arm 10 about the lower arm rotation pin 32. Therefore, the lower arm 10 defines an angle with respect to the internal surface of the door 50. The door 50 moves to the outside of the vehicle body, and the door 50 begins to be opened.

Figure 8:
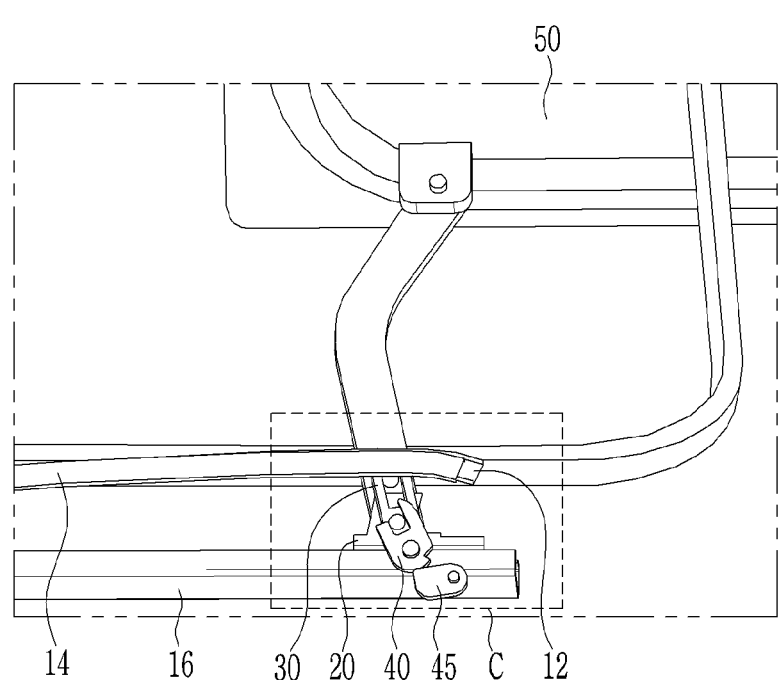
FIG. 8 is a view exemplarily illustrating a primary opening completion state of the sliding door device for a vehicle according to the exemplary embodiment of the present disclosure.
Figure 9:
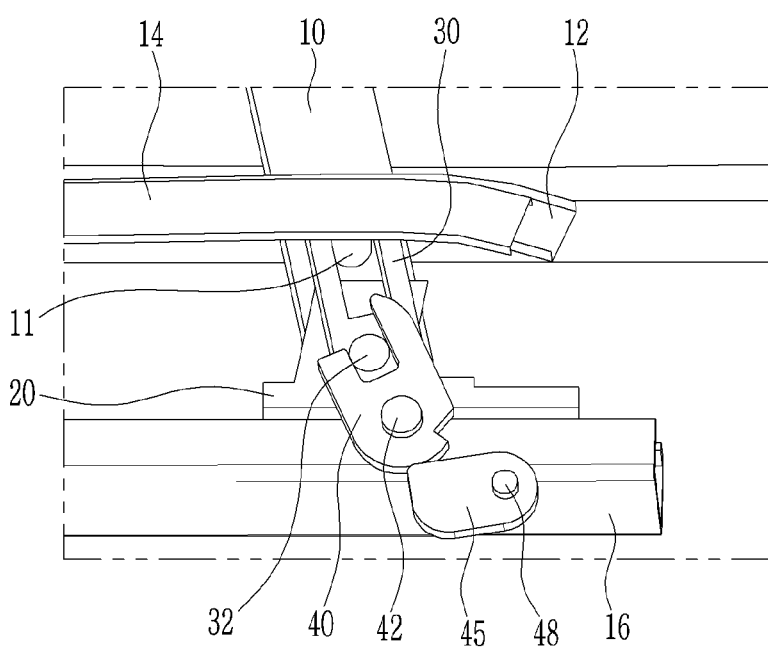
FIG. 9 is an enlarged view of part 'C' in FIG. 8.

FIG. 8 is a view exemplarily illustrating a primary opening completion state of the sliding door device for a vehicle according to the exemplary embodiment of the present disclosure, and FIG. 9 is an enlarged view of part 'C' in FIG. 8.

Referring to FIG. 8 and FIG. 9, when the door 50 begins to be opened and the other end portion of the lower arm 10, the lower arm carrier 20, and the lower arm rotor 30 continuously move toward the rear side of the vehicle, the lower arm rotor 30 comes into contact with and is coupled to the catch 40.

A pair of legs 300 having different lengths is provided at one end portion of the lower arm rotor 30. A pair of legs 400 having different lengths is provided at one end portion of the catch 40. When the other end portion of the lower arm 10 continuously moves toward the rear side of the vehicle, the catch pin 42 is inserted between and comes into contact with the pair of legs provided at one end portion of the lower arm rotor 30, and the lower arm rotation pin 32 is inserted between and comes into contact with the pair of legs provided at one end portion of the catch 40 so that the lower arm rotor 30 and the catch 40 are coupled. Furthermore, when the lower arm 10 moves, the lower arm rotor 30 and the catch 40 rotate together about the catch pin 42 in the state in which the lower arm rotor 30 and the catch 40 are fixed. Therefore, the door 50 is completely opened primarily.

Figure 10:
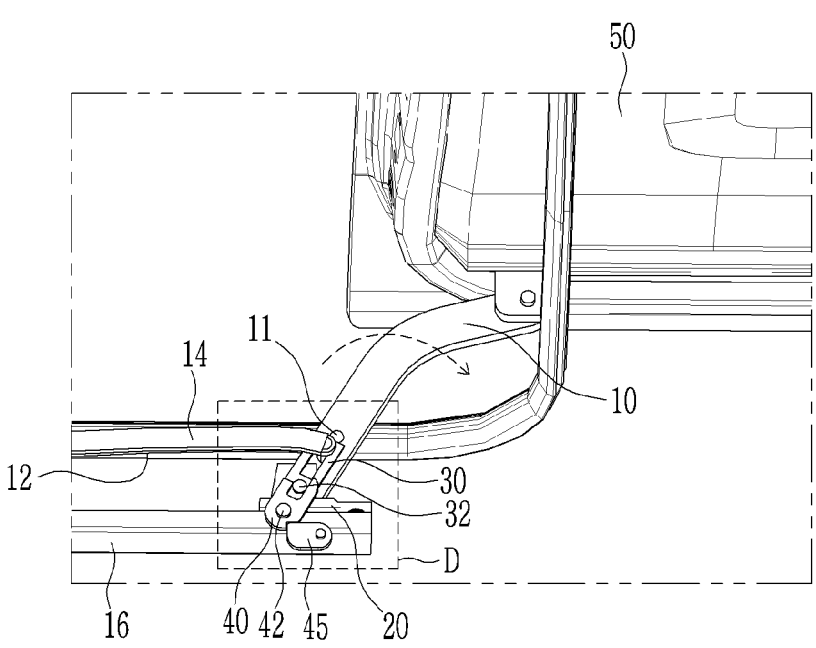
FIG. 10 is a view exemplarily illustrating a secondary opening completion state of the sliding door device for a vehicle according to the exemplary embodiment of the present disclosure.
Figure 11:
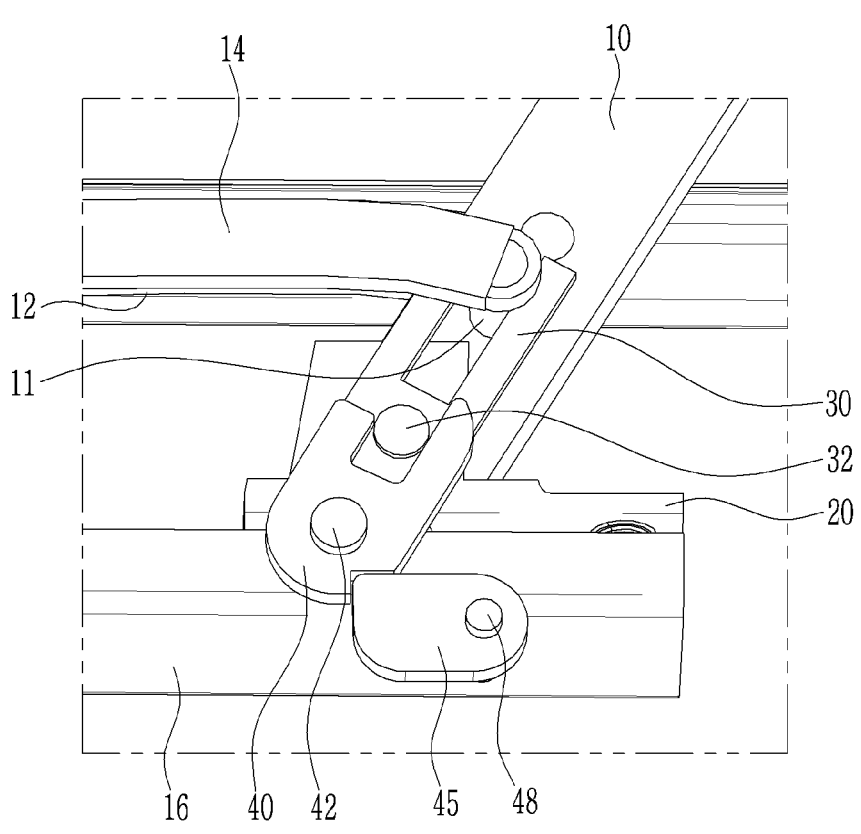
FIG. 11 is an enlarged view of part 'D' in FIG. 10.

FIG. 10 is a view exemplarily illustrating a secondary opening completion state of the sliding door device for a vehicle according to the exemplary embodiment of the present disclosure, and FIG. 11 is an enlarged view of part 'D' in FIG. 10.

Referring to FIG. 10, and FIG. 11, when the other end portion of the lower arm 10, the lower arm carrier 20, and the lower arm rotor 30 further move toward the rear side of the vehicle, the lower arm rotor 30 and the catch 40 further rotate toward the rear side of the vehicle in the state in which the lower arm rotor 30 and the catch 40 are fixed so that the other end portion of the catch 40 is fixed by engaging with one end portion of the pawl 45. To the present end, the other end portion of the catch 40 includes a groove into which a protruding portion provided at one end portion of the pawl 45 is inserted.

In a state in which the other end portion of the catch 40 is fixed by engaging with one end portion of the pawl 45, one end portion of the lower arm 10 further move toward the rear side of the vehicle so that the door 50 is further opened. When the upper roller 11 and the lower roller 13 at the other end portion of the lower arm 10 move to an end portion of the upper rail 14 and an end portion of the first lower rail 12, the opening operation of the door 50 is stopped, and the secondary opening operation is completed.

Meanwhile, a process of closing the door 50 is performed in the reverse order to the process of opening the door 50 that has been described with reference to FIG. 3, FIG. 4, FIG. 5, FIG. 6, FIG. 7, FIG. 8, FIG. 9, FIG. 10 and FIG. 11. In the secondary opened state of the door 50 illustrated in FIG. 10, when a cable connected to one end portion of the pawl 45 is pulled toward the vehicle body, the pawl 45 is rotated, the other end portion of the catch 40 and one end portion of the pawl 45 are disengaged.

Thereafter, when the other end portion of the lower arm 10 further moves toward a front side of the vehicle, the lower arm 10 rotates, and the lower arm rotor 30 and the catch 40 are disengaged. In the instant case, an elastic member such as a spring may be provided on the pawl shaft 48 so that the catch 40 may be returned to an original position thereof.

When the other end portion of the lower arm 10 further moves toward the front side of the vehicle, the upper roller 11 and the lower roller 13 of the lower arm 10 roll along the upper rail 14 and the first lower rail 12 so that the lower arm 10 rotates, and the door 50 is closed.

As described above, according to the exemplary embodiment of the present disclosure, the lower arm, which moves along the dual rail, is applied to enable the door to slide and rotate so that a door opening width may be ensured.

Furthermore, the extent to which the lower arm enters the interior of the vehicle body is eliminated so that the vehicle body having a flat structure may be implemented, and a height (step height) of the vehicle body may be reduced.

Furthermore, the rectilinear motion of the door is implemented, which makes it possible to improve a degree of freedom of a layout and a degree of design freedom of the interior.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sliding door apparatus for a vehicle, the sliding door apparatus comprising:

a door configured to open or close a door opening portion formed in a vehicle body;

a lower arm including a first end portion connected to an internal side of the door, and a second end portion configured to slide along a rail provided on the vehicle body;

a lower arm carrier rotatably connected to the second end portion of the lower arm and configured to slide the lower arm while moving along the rail provided on the vehicle body;

a lower arm rotor rotatably provided on the lower arm carrier and including an end portion connected to the lower arm so that the lower arm rotates;

a catch configured to fix the door by engaging with the lower arm rotor after the door slides; and a pawl with which the catch engages by rotating so that a rotation of the catch is prevented, wherein the catch is rotatably provided at an upper end portion of a rail box that surrounds a second lower rail.

2. The sliding door apparatus of claim 1, wherein the rail includes a first lower rail and an upper rail, and wherein the second end portion of the lower arm slides along the first lower rail and the upper rail provided at a lower side of the vehicle body.

3. The sliding door apparatus of claim 1, wherein the lower arm carrier slides the lower arm while moving along the second lower rail provided at a lower side of the vehicle body.

4. The sliding door apparatus of claim 3, further including a lower arm rotation pin, wherein the lower arm carrier is rotatably coupled to an upper surface of the lower arm by the lower arm rotation pin and rectilinearly moves along the second lower rail.

5. The sliding door apparatus of claim 2, further including:

an upper roller rotatably provided on an upper surface of the second end portion of the lower arm, wherein the upper roller is inserted into the upper rail and rolls in a longitudinal direction of the upper rail.

6. The sliding door apparatus of claim 1, wherein pairs of legs having different lengths are respectively provided at end portions of the lower arm rotor and the catch.

7. The sliding door apparatus of claim 6, further including a catch pin and a lower arm rotation pin, wherein when the door is opened, the catch pin is inserted between and comes into contact with the pair of legs of the lower arm rotor and the lower arm rotation pin is inserted between and comes into contact with the pair of legs of the catch, and wherein when the lower arm moves, the lower arm rotor and the catch rotate together about the catch pin in a state in which the lower arm rotor and the catch are fixed.

8. The sliding door apparatus of claim 6, wherein when the door is opened, the lower arm rotor and the catch further rotate toward a rear side of the vehicle in a state in which the lower arm rotor and the catch are fixed, and an end of the catch is fixed by engaging with an end portion of the pawl.

9. The sliding door apparatus of claim 6, further including a cable connected to the pawl, wherein when the door is closed, the cable connected to the pawl is pulled toward the vehicle body, the pawl is rotated, and the catch and an end portion of the pawl are disengaged.

10. The sliding door apparatus of claim 6, wherein when the door is closed, the lower arm rotor and the catch further rotate toward a front side of the vehicle in a state in which the lower arm rotor and the catch are fixed so that the lower arm rotor and the catch are disengaged, and the catch returns to an original position thereof.

11. The sliding door apparatus of claim 2, further including a lower roller, wherein the lower roller is rotatably provided on a lower surface of the second end portion of the lower arm, and wherein the lower roller is inserted into the first lower rail and rolls in a longitudinal direction of the first lower rail.

12. The sliding door apparatus of claim 11, wherein the upper rail and the first lower rail each include a curved shape so that the door moves inward or outward relative to the vehicle when the lower arm moves along the upper rail and the first lower rail.

13. The sliding door apparatus of claim 1, wherein the lower arm carrier includes a plurality of lower arm carrier rollers, and wherein the plurality of lower arm carrier rollers rolls along an internal surface of the second lower rail.

14. The sliding door apparatus of claim 13, further including a lower arm rotation pin, wherein the lower arm rotor is rotatably coupled to an upper surface of the lower arm carrier by the lower arm rotation pin and disposed in a direction parallel to a longitudinal direction of the lower arm.

15. The sliding door apparatus of claim 2, wherein the upper rail and the first lower rail each include a curved shape so that the door moves inward or outward relative to the vehicle when the lower arm moves.

16. The sliding door apparatus of claim 1, further including a catch pin, wherein the catch is provided to be rotatable about the catch pin provided on the rail box.

17. The sliding door apparatus of claim 1, wherein the lower arm rotor is disposed in a direction parallel to a longitudinal direction of the lower arm.

18. The sliding door apparatus of claim 1, further including a lower arm rotation pin, wherein the lower arm rotor is rotatably provided on the lower arm carrier by the lower arm rotation pin provided on the lower arm carrier.

* * * * *